US012016420B2

(12) United States Patent
Stratton et al.

(10) Patent No.: US 12,016,420 B2
(45) Date of Patent: Jun. 25, 2024

(54) COMBINED FAST-SWITCH TINTABLE VISOR

(71) Applicant: Rockwell Collins, Inc., Cedar Rapids, IA (US)

(72) Inventors: Eric P. Stratton, Portland, OR (US); Christopher A. Keith, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 453 days.

(21) Appl. No.: 17/245,223

(22) Filed: Apr. 30, 2021

(65) Prior Publication Data
US 2022/0346489 A1 Nov. 3, 2022

(51) Int. Cl.
*A42B 3/22* (2006.01)
*G02B 27/01* (2006.01)
*G02C 7/10* (2006.01)
*G02F 1/163* (2006.01)

(52) U.S. Cl.
CPC .......... *A42B 3/226* (2013.01); *G02B 27/0172* (2013.01); *G02C 7/101* (2013.01); *G02C 7/102* (2013.01); *G02F 1/163* (2013.01); *A42B 3/228* (2013.01); *G02B 2027/0178* (2013.01)

(58) Field of Classification Search
CPC .... A42B 3/226; A42B 3/228; G02B 27/0172; G02B 2027/0178; G02C 7/101; G02C 7/102; G02F 1/163; G02F 2202/14
See application file for complete search history.

(56) References Cited

U.S. PATENT DOCUMENTS

| | | |
|---|---|---|
| 9,910,278 B1 | 3/2018 | Campbell et al. |
| 10,522,106 B2 | 12/2019 | Hazra et al. |
| 10,714,047 B2 | 7/2020 | Kim et al. |
| 10,768,500 B2 | 9/2020 | Osterhout |
| 10,845,600 B2 | 11/2020 | Perdices-Gonzalez et al. |
| 2011/0075265 A1* | 3/2011 | Alekseyev-Popov ........ A42B 3/226 359/630 |

(Continued)

FOREIGN PATENT DOCUMENTS

| | | |
|---|---|---|
| CN | 112147800 A | 12/2020 |
| KR | 101986192 B1 | 6/2019 |

OTHER PUBLICATIONS

Extended Search Report in European Application No. 22168484.8 dated Jul. 15, 2022, 6 pages.

*Primary Examiner* — Wyatt A Stoffa
*Assistant Examiner* — Ray Alexander Dean
(74) *Attorney, Agent, or Firm* — Suiter Swantz IP

(57) ABSTRACT

A visor for a helmet is disclosed. The visor includes a first lens member, which includes a first transparent shield configured with a photochromic layer. The photochromic layer is configured to adjust a first transmission state of a first viewing area of the first lens member based on the transmission of ambient light through the first viewing area. The visor also includes a second lens member that includes an electrochromic layer. The electrochromic layer is configured to adjust the transmission of ambient light through a second viewing area upon an application of a voltage to the electrochromic layer. The visor also includes a controller configured to adjust a voltage applied to the electrochromic layer, and an attachment element coupled to the first lens member configured to attach to a headgear.

10 Claims, 6 Drawing Sheets

(56) References Cited

U.S. PATENT DOCUMENTS

| | | |
|---|---|---|
| 2017/0090194 A1 | 3/2017 | Hayes |
| 2017/0315384 A1* | 11/2017 | Saylor .................... G02C 7/104 |
| 2018/0188537 A1 | 7/2018 | Osterhout et al. |
| 2019/0298574 A1* | 10/2019 | Seo ........................ G02C 11/12 |
| 2020/0018963 A1 | 1/2020 | Osterhout |
| 2020/0050023 A1 | 2/2020 | Vasiliev et al. |
| 2020/0159021 A1 | 5/2020 | Allen |
| 2020/0349902 A1 | 11/2020 | Machida |
| 2021/0241713 A1* | 8/2021 | Vaarlid .................... G09G 3/38 |

\* cited by examiner

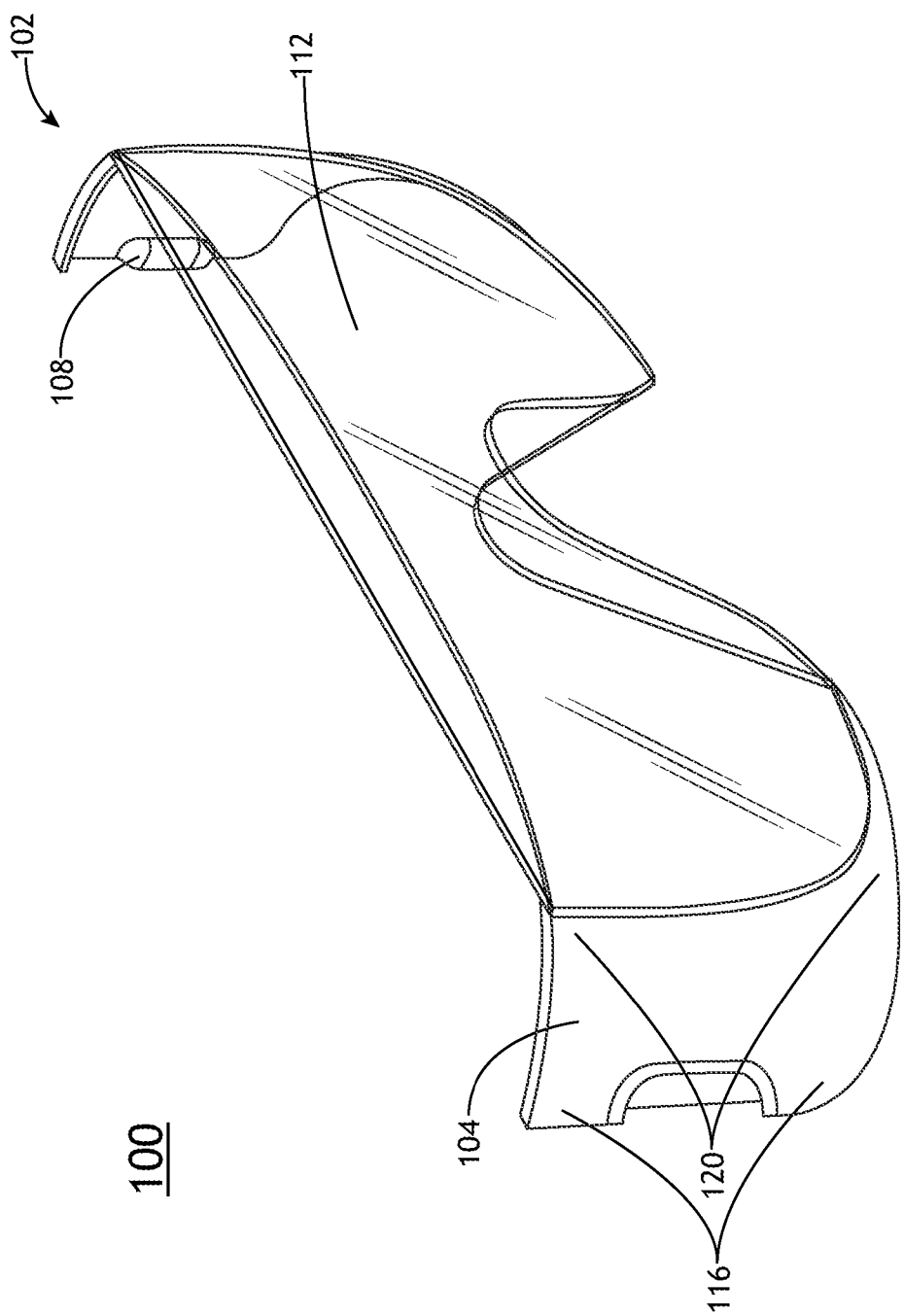

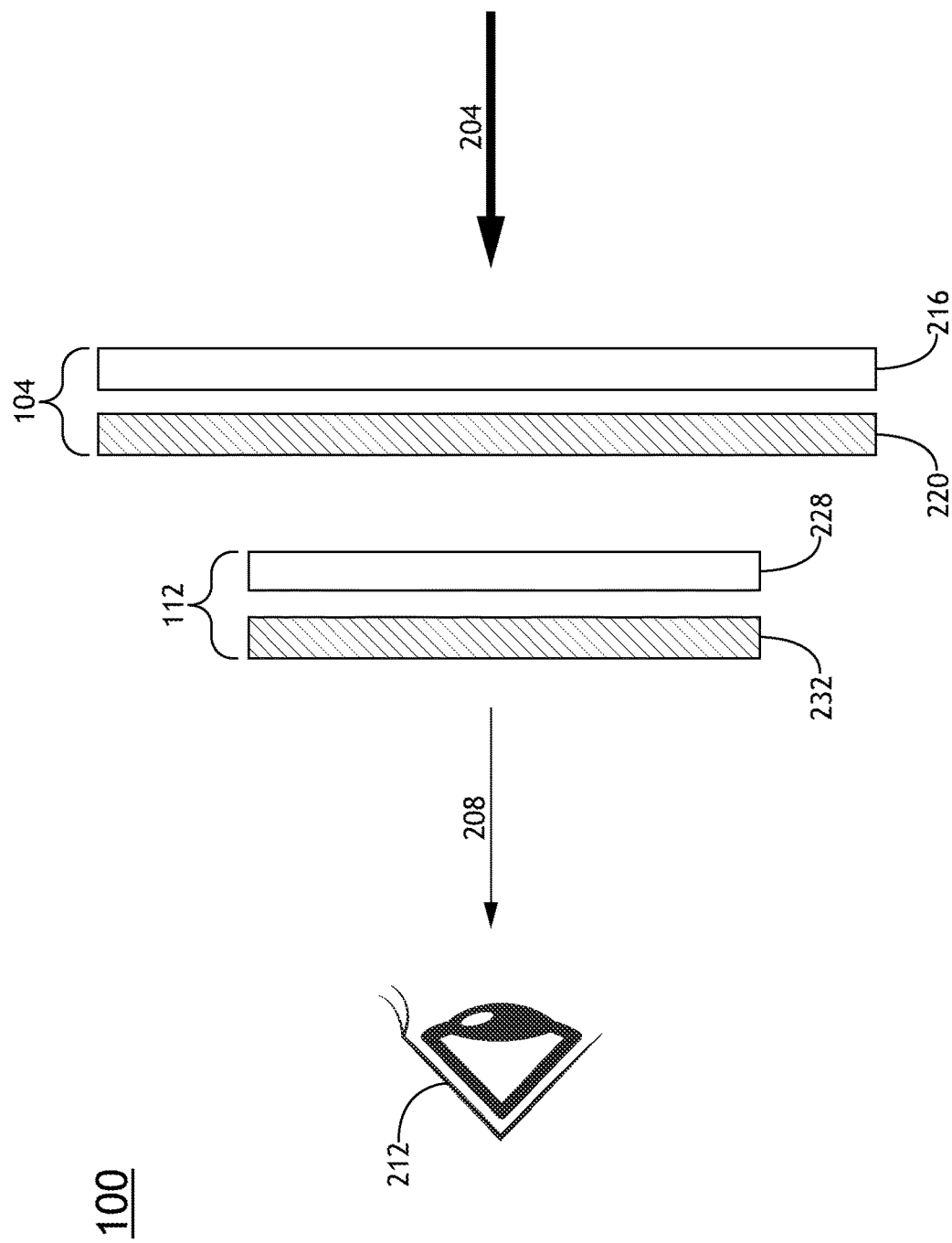

COMBINED FAST-SWITCH TINTABLE VISOR

BACKGROUND

Manned flight requires that pilots have the visual acuity necessary for operating the aircraft under a variety of light conditions. For example, pilots may operate under both bright sunlight and pitch-black night conditions. Pilots operating with Head-Up Displays (HUD) and other light emitting instruments need substantial contrast between the displays and the real world outside during these differing light conditions. In some cases, contrast may be improved by the use of a visor, such as a visor coupled to a flight helmet Conventional military visors are configured with steeply curved plastic elements that are typically clear for nighttime operations and/or tinted for daytime operation. For example, a pilot may have a clear visor in all modes, and a tinted visor that slides down upon deployment for bright ambient light conditions.

Current visor development is to combine clear and tinted visors into a single visor, or visor element, that changes its relative light transmission. This change may be achieved via photochromic stimulation which activates the visor, turning the visor dark over time. However, photochromic coatings are inherently passive and slow, whereas pilots require visors that rapidly change in order to improve situational awareness. Alternatively, a visor may use an electrochromic element to rapidly tint and untint the visor. However, the range of tinting by electrochromic elements are often not acceptable for tinting ranges required by military and/or avionic visors. Therefore, it is desirable to provide a visor with faster light adjustment and greater dimming range than conventional visors

SUMMARY

A system is disclosed. In one or more embodiments, the system includes a visor. In one or more embodiments, the system further includes a first lens member. In one or more embodiments, the first lens member includes a first transparent shield configured with a first viewing area. In one or more embodiments, the first lens member further includes a photochromic layer coupled configured to adjust a first transmission state of the first viewing area based on the transmission of light through the first viewing area. In one or more embodiments, the system further includes a second lens member. In one or more embodiments, the second lens member includes a second transparent shield configured with a second viewing area. In one or more embodiments, the second lens member further includes an electrochromic layer configured to reduce transmission of ambient light through the second viewing area upon an application of a voltage to the electrochromic layer. In one or more embodiments, the system further includes a controller configured to adjust a voltage applied to the electrochromic layer. In one or more embodiments, the electrochromic layer is configured to adjust a second transmission state of the electrochromic layer based on the voltage. In one or more embodiments, the system includes an attachment element coupled to the first lens member and configured to attach to a headgear.

In some embodiments of the system, the second lens member overlaps with, or is otherwise integrated within, the first lens member, wherein the first viewing area and the second viewing area overlap.

the controller is configured to adjust the voltage based on at least one of the first transmission state or a predicted first transmission state.

In some embodiments of the system, the first lens member further comprises a curved surface.

In some embodiments of the system, the second lens member is configured as a flat surface.

In some embodiments of the system, the headgear is configured as at least one of a helmet, or head mounted display.

In some embodiments of the system, the second transmission state is further configured to be manually adjustable.

In some embodiments of the system, the system further includes a photochromic layer sensor configured to measure light transmittance through the photochromic layer.

In some embodiments of the system, the system further includes an electrochromic layer sensor configured to measure light transmittance through the photochromic layer.

In some embodiments of the system, the system further includes a visor sensor configured to measure light transmittance through the visor.

In some embodiments of the system, the system further includes a user interface configured to adjust the voltage applied to the electrochromic layer.

In some embodiments of the system, the user interface is disposed on an instrument panel.

In some embodiments of the system, the user interface is disposed on the headgear.

In some embodiments of the system, the system further includes an ambient light sensor communicatively coupled to the electrochromic layer configured to detect ambient light levels in at least one of an area adjacent to the visor or within a cockpit.

In some embodiments of the system, the ambient light sensor is physically coupled to at least one of the visor or the headgear.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1B is a drawing illustrating a perspective face-view of a visor, in accordance with one or more embodiments of this disclosure;

FIG. 2 is a block diagram illustrating an organization of first lens member and the second lens member at an overlap between the first viewing area and the second viewing area, in accordance with one or more embodiments, of the disclosure;

DETAILED DESCRIPTION

Figure 1A:
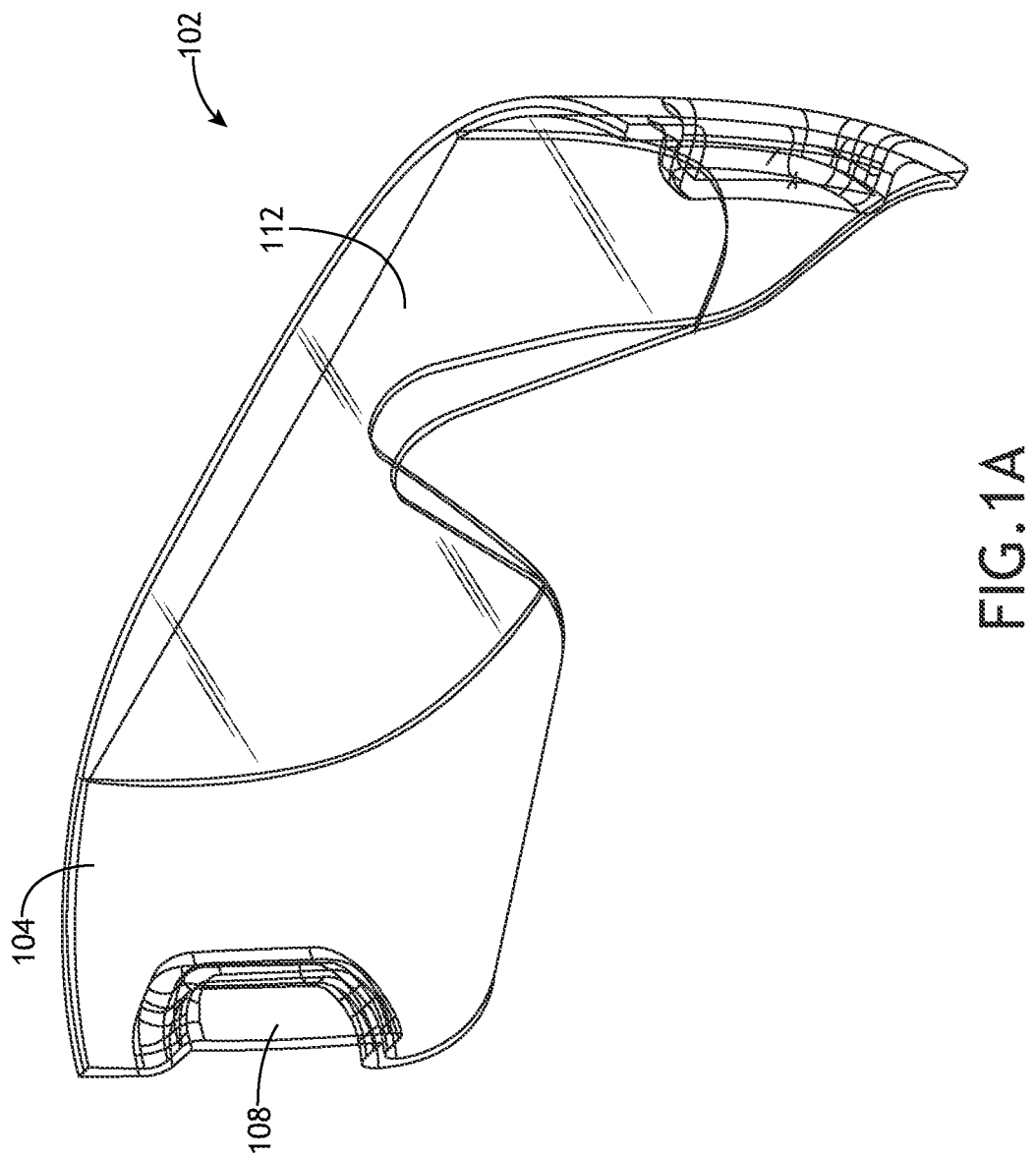
FIG. 1A is a drawing illustrating a system that includes a visor, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A visor for an aircraft pilot is disclosed. Broadly, the visor is configured to adjust a tint characteristic based on the level of ambient light. More specifically, the visor if configured with both electrochromic and photochromic layers used tandemly. The slow-activating photochromic layer is used throughout the viewing area of the visor, while the fast-activating electrochromic layer is placed within the area utilized the most for vision, such as the viewing area of head mounted display (HMD). This arrangement is particularly advantageous. For example, both photochromic and electrochromic technologies work together to provide the dynamic range of transmission required, with neither layer required to fully bear the brunt of full dynamic range. In another example, a reduced electrochromic viewing area in comparison to the photochromic viewing area reduces both cost and power usage of the electrochromic layer.

FIG. 1A is a drawing illustrating a system 100 that includes a visor 102, in accordance with one or more embodiments of this disclosure. The visor 102 may be utilized for any vision-based application including but not limited to piloting an aircraft, operating a ground vehicle (e.g., bus, train, or automobile), performing mission objective (e.g., by ground troops, or police), or space-based activities. For example, the visor may be utilized by a pilot (e.g., integrated into a helmet) flying within a cloud formation, wherein the ambient light entering the cockpit may changes quickly and dramatically. In another example, the visor may be used by a ground troop using an augmented reality HMD that is moving back and forth from darkened rooms to bright outside ambient light.

In some embodiments, the visor 102 includes a first lens member 104. The first lens member 104 is the major lens member of the visor 102. The first lens member 104 provides impact protection and is configured to change a tint characteristic based on the level of ambient light via photochromic technology. For example, in a low ambient light environment (e.g., nighttime), the first lens member 104 is highly transmittable for light. For instance, the first lens member 104 may have a transmittance (e.g., percent transmittance of ambient light) in a range of 60% to 100% (e.g., at nighttime). In another example, in a high ambient light environment (e.g., bright sunlight during the daytime), the first lens member may have a transmittance in the range of zero to 40%.

In embodiments, the first lens member 104 includes an attachment element 108 configured to attach the first lens member 104 to a headgear. The headgear may be any type of headgear including but not limited to a helmet or an HMD. For example, the helmet may be any type of helmet used by aircraft pilots including but not limited to an F-35 helmet, a next generation helmet mounted display (NGHMD), a future vertical lift (FVL) helmet/display, and an embedded virtual avionics (EVA) display. In another example, the helmet may be used by a pilot for any aircraft including but not limited to a jet aircraft, a propeller driven aircraft (e.g., a turboprop aircraft) or rotary wing aircraft. In another example, the HMD may be any type of HMD display including but not limited to an augmented reality display. The attachment element 108 may be of any type and number. For example, the attachment elements may be configured as an area of differing thicknesses that enable to the visor 102 to snap onto a helmet mounting via a friction lock (e.g., an interference fit). In another example, the attachment element may include one or more holes that allow the visor 102 to be attached to a helmet via one or more screws.

In some embodiments, the visor 102 further includes a second lens member 112. The second lens member 112 provides impact protection and is configured to change a tint characteristic based on an applied voltage via electrochromic technology. For example, in the absence of an applied voltage, the second lens member may be highly transmissible (e.g., 90% to 100% transmission of bright daylight). In another example, the second lens member may have a transmittance in a range of zero to 40% in the presence of an applied voltage. The applied voltage may be a constant voltage or a variable voltage. For example, the voltage may be varied manually or automatically based on the needs of the user. For instance, the voltage may be varied based on the need for the second lens member to reduce the transmittance of light. In another instance, the voltage may be adjusted based on ambient light levels, FIG. 1B is a drawing illustrating a perspective face-view of the visor 102, in accordance with one or more embodiments of this disclosure. In some embodiments, the first lens member 104 includes a first viewing area 116 and a second viewing area. The first viewing area 116 comprises the transparent surface of the first lens member 104 that may be viewed by a user, while the second viewing area comprises the transparent surface of the second lens member 112. The first viewing area 116 and the second viewing area 120 may overlap. For example, the first viewing area 116 may include both the front portion and the side portion of the first lens member 104, while the second viewing area 120 may be limited to only the front portion of the second lens member 112 (e.g., the second viewing area 120 completely overlapping the first viewing area.). In some embodiments, the first viewing area 116 may only partially overlap, or not overlap at all, with the second viewing area. For example, the first viewing area 116 may only include the side portion of the first lens member 104, while the second viewing area 120 only includes the front portion of the second lens member 112.

The first lens member 104 and the second lens member 112 may be of any size or shape. For example, the first lens member 104 may have one or more curved areas or plane curves (e.g., a curved surface). For instance, the first lens member 104 may have a relatively flat surface in the area where the first viewing area 116 and the second area 120 overlap on the front portion of the visor 102, the transition via a curved surface to the side portion of the first lens member 104. In another example, the second lens member 112 may include a flat surface or flat plane. For instance, the second lens member 112 may comprise a flat plane where the first viewing area 116 and the second area overlap on the front portion of the visor. The flat plane surface of the second viewing area 120 provides a simple surface and cost-effective on which to build electrochromic elements.

Figure 1C:
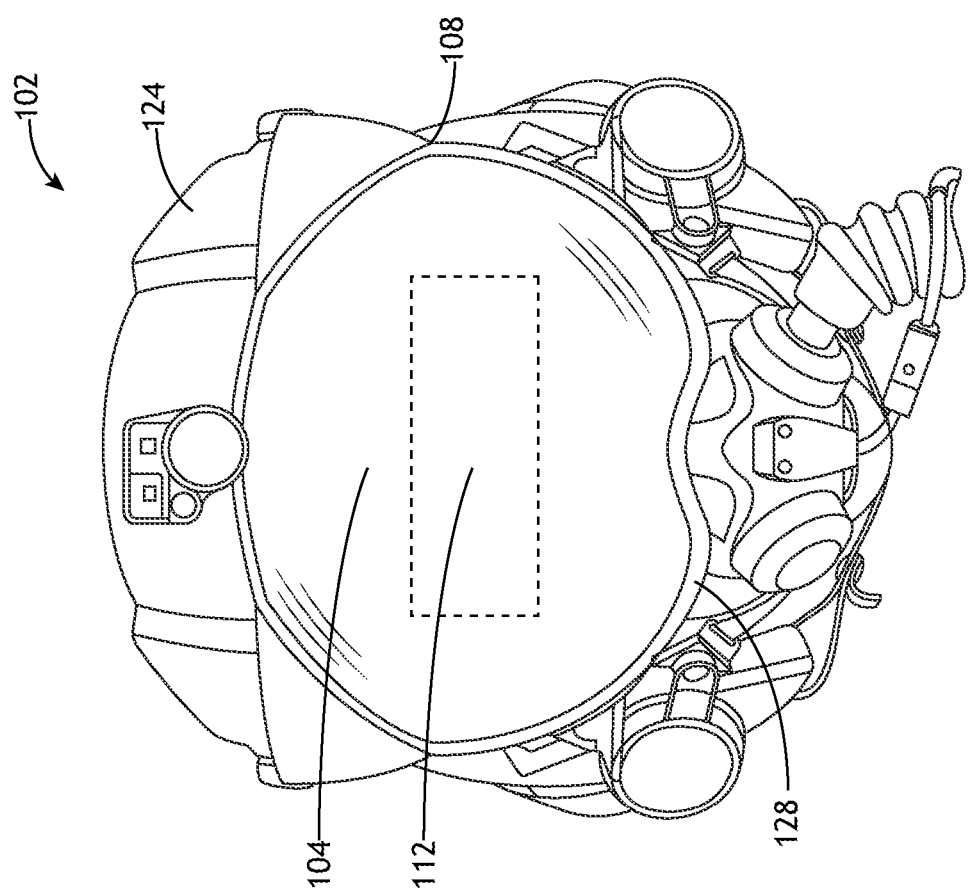
FIG. 1C is a drawing illustrating a perspective view of a visor integrated into a flight helmet, in accordance with one or more embodiments of this disclosure.

FIG. 1C is an illustration of the visor 102 incorporated into a helmet 122 (e.g., headgear), in accordance with one or more embodiments of the disclosure. The visor 102 is attached to the helmet 124 via the attachment element 108. The visor 102 includes the first lens member 104 containing the first viewing area 116, and the second lens member 112 containing the second viewing area 120 (e.g., indicated by the dotted square). The visor 102 may also include a third lens member 128 configured as a shield to protect the pilot. The third lens member 128 may be tinted or non-tinted.

FIG. 2 is a block diagram illustrating an organization of first lens member 104 and the second lens member 112 at an overlap between the first viewing area 116 and the second viewing area 120, in accordance with one or more embodiments, of the disclosure. The first lens member 104 and the second lens member 112 work together to reduce high intensity ambient light 204 to a low intensity ambient light 208 from reaching the user's eye 212.

The first lens member 104 includes a first transparent shield 216 configured to provide a substrate for photochromic elements and protect the eye/face of the user. The first transparent shield 216 may be formed of any transparent or semi-transparent material including but not limited to plastic and glass. For example, the first transparent shield 216 may include impact resistant resin. For instance, the first transparent shield 216 may include an impact resistant polycarbonate resin.

In embodiments, the first lens member 104 further includes a photochromic layer 220 configured to adjust a first transmission state of the first viewing area based on the transmission of light through the first viewing area 116. The photochromic layer 220 may include any type of photochromic material including but not limited to spiropyrans, spirooxanes, diarlethenes, azobenzenes, phorchromic quinones, inorganic photochromics, hexaarylbiimidazole, and photochromic coordination compounds. The photochromic layer 220 may be configured to charge the transmissivity of light in as few as three minutes. For example, the photochromic layer 220 may be configured to transition from approximately 30% transmissivity to approximately 90% in approximately two minutes. In another example, the photochromic layer 220 may be configured to transition from approximately 90% transmissivity to approximately 30% in approximately two minutes.

The photochromic layer 220 may be configured as a separate layer than the first transparent shield 216. For example, the photochromic layer 220 may be configured as a coating applied to the first transparent shield 216. In another example, the photochromic layer 220 may be configured as a solid layer (e.g., plastic layer) embedded with the photochromic material. The photochromic layer 220 may also be embedded within, or integrated with, the first transparent shield. Therefore, the above description should not be interpreted as a limitation of the present disclosure, but merely an illustration.

The second lens member 112 includes a second transparent shield 228 configured to provide a substrate for photochromic elements and/or protect the eye/face of the user. The second transparent shield 228 may be formed of any transparent or semi-transparent material including but not limited to plastic and glass. For example, the first transparent shield 228 may include impact resistant resin. In another example. the first transparent shield 228 may include borosilicate glass.

In embodiments, the second lens member 112 further includes an electrochromic layer 232 configured to adjust a second transmission state of the second viewing area 120 based on a voltage applied to the electrochromic layer 232. The electrochromic layer 232 may include any type of electrochromic scheme. For example, the electrochromic layer may be configured as a suspended-particle device. For instance, the electrochromic layer may be configured as a thin laminate of rod-like nano-scale particles suspended in a liquid and placed between two pieces of glass or plastic or attached to one layer. In this instance, the suspended particles are arranged in a light-absorbing, random arrangement when no voltage is applied, then becoming arranged in a light transmitting alignment upon the application of voltage to the system.

In another example, the electrochromic layer 232 may include electrochromic devices that increase opacity in response to an applied voltage. For instance, the electrochromic layer 232 may be configured as a transition metal hydride electrochromic device. In another instance, the electrochromic layer 232 may be configured as a nanocrystalline film associated with a transparent conductor such as indium tix oxide or poly(3,4-ethylenedioxythiophene)

polystyrene sulfonate (PEDOT:PSS), with chromogens that change color by reduction or oxidation. In another example, the electrochromic layer may be a polymer-dispersed liquid-crystal device (PDLC). In another example, the electrochromic layer may be configured as a micro-blind. For instance, the micro-blind may be configured as an array of rolled thin metal blinds that roll upon an applied voltage, altering transmission of light through the electrochromic layer.

The electrochromic layer 232 may be configured as a separate layer than the second transparent shield 228. For example, the electrochromic layer 232 may be configured as a coating or laminate applied to the second transparent shield 228. In another example, the electrochromic layer 232 may be configured as a solid layer (e.g., glass layer) embedded with the electrochromic material. The electrochromic layer 232 may also be embedded within, or integrated with, the second transparent shield 228. Therefore, the above description should not be interpreted as a limitation of the present disclosure, but merely an illustration.

Figure 3:
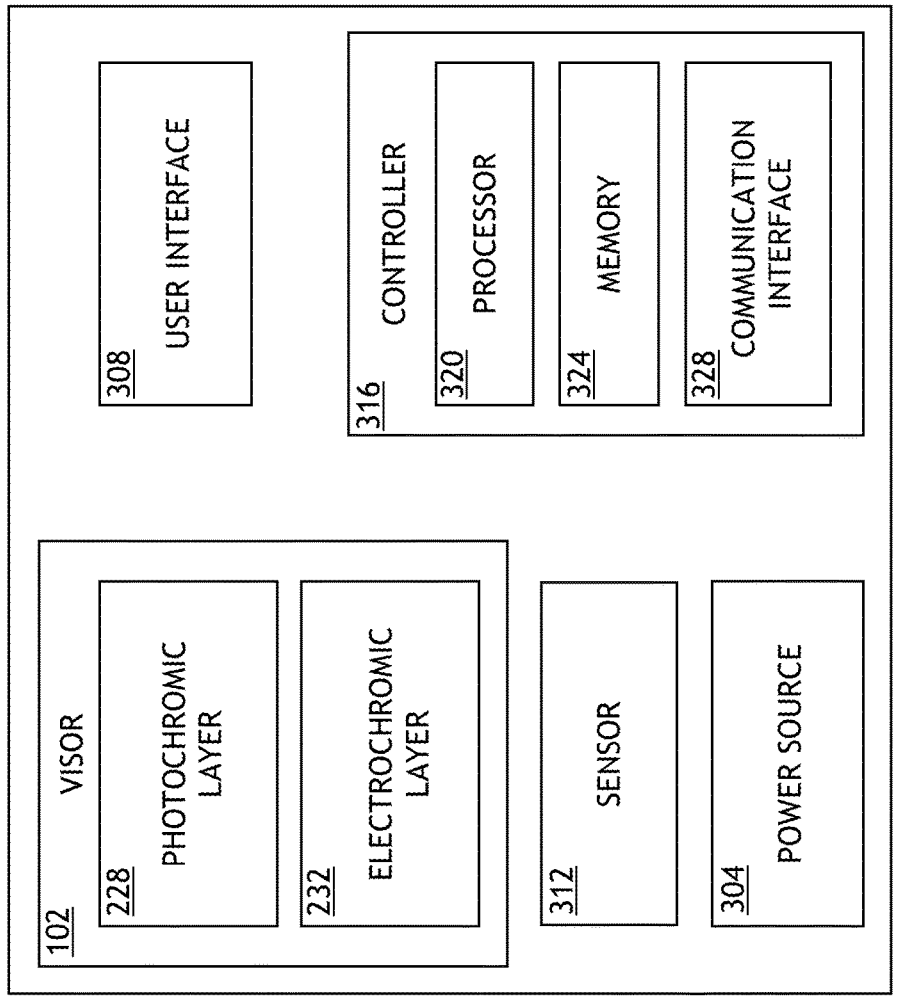
FIG. 3 is a block diagram illustrating the system in accordance with one or more embodiments of the disclosure. The system includes the visor containing the electrochromic layer and the photochromic layer.

FIG. 3 is a block diagram illustrating the system 100 in accordance with one or more embodiments of the disclosure. The system 100 includes the visor 102 containing the electrochromic layer 232 and the photochromic layer 220.

In some embodiments, the system 100 includes a power source 304 configured to apply a voltage to the electrochromic layer 232. The power source 304 may be configured as any power delivery device capable of applying a voltage to the electrochromic layer 232 including but not limited to batteries (e.g., disposable or rechargeable), a capacitor, a voltage relaying conductor (e.g., delivering a voltage from a vehicle power source), and an energy harvesting device (e.g., a solar cell). The power source 304 may be disposed within the visor 102, within the headgear, or within the confines of the vehicle. The power source 304 may be integrated within an onboard electrical system of the vehicle via an electrical interface. For example, the onboard electrical system of the vehicle may be configured to monitor and/or control the voltage of the system 100 via the electrical interface.

In some embodiments, the system 100 includes a user interface 308 operatively coupled to the power source 304 and configured to adjust the application of voltage from the power source 304 to the electrochromic layer 232. The user interface 308 may be configured as any type of user interface 308. For example, the user interface 308 may be configured as one or more switches implemented along the visor 102 or associated helmet. In another example, the user interface 308 may be disposed on an aircraft instrument panel. In another example, the user interface 308 may be implemented on both the visor and/or helmet and the aircraft instrument panel. The user interface 308 may be implemented with an on/off switch, an adjustment switch, and or a settings component for setting specific configurations of the visor. For example, the user interface may be configured to set minimum and maximum opaque settings for a variety of light conditions. In some embodiments, the initial settings of the electrochromic layer 232 and/or adjustments to the electrochromic layer 232 are made automatically via the system 100.

In some embodiments, the system includes one or more sensors 312 operatively coupled to the electrochromic layer 232, the photochromic layer 220, the user interface 308, the controller 316, and/or the power source 304. For example, one of the one or more sensors may be configured as an ambient light sensor. For instance, the photochromic layer 220 may be calibrated with the ambient light sensor so that a reading of the ambient light sensor would correspond to the tint of the photochromic layer 220. In another instance, the tint of the electrochromic layer 232 may be calibrated to the ambient light sensor and/or the voltage applied to the electrochromic layer. In another instance, both the photochromic layer 220 and the electrochromic layer 232 are regulated/calibrated based on the ambient light sensor. The ambient light sensor and associated controller 316 may be configured to control the overall tint of the system (e.g., the electrochromic layer 232 and the photochromic layer 220) via the voltage control of the electrochromic layer 232. In another example, the one or more sensors 312 are configured to detect the opacity (e.g., percent transmission) of the electrochromic layer 232 and/or the photochromic layer to the system 100. The system 100 may then adjust the voltage applied to the electrochromic layer so as to adjust the visor 102 to the correct opacity. For example, separate sensors 312 may measure the percent transmittance of the electrochromic layer 232 and the photochromic layer 220. For instance, for a system 100 that requires a current visor transmittance of 50%, with a photochromic layer sensor measuring a transmittance level of 80%, the system 100 may adjust the voltage applied to the electrochromic layer 232 so that the overall transmittance of the visor 102 is the targeted 50%. The ambient light sensor may be communicatively coupled to the electrochromic layer and configured to detect ambient light levels in either an area adjacent to the visor 102 or within a cockpit. The ambient light sensor may also be physically coupled to at least one of the visor 102 or the headgear. The system 100 may include an electrochromic layer sensor that detects the transmittance adjustment made to the electrochromic layer 232. The system may also include a photochromic/electrochromic sensor that measures the transmittance through both the photochromic layer 220 and the electrochromic layer 232.

Alternatively, one sensor 312 may measure the percent transmittance of both the photochromic layer 220 and the electrochromic layer 232 together (e.g., visor transmittance), with the system 100 configured to adjust the electrochromic layer 232 accordingly. For example, for a system 100 that requires a visor transmittance of 50%, with a sensor 312 currently measuring visor transmittance is at 80% the voltage applied to the electrochromic layer 232 may be adjusted so that the sensor 312 measures a visor transmittance of 50%. Through continuous measurement of the light transmittance through the photochromic layer 220, the electrochromic layer 232, or both the photochromic layer 220 and the electrochromic layer 232, the system 100 can control the In some embodiments, the system 100 includes a controller 316 that includes one or more processors 320, a memory 324, and a communication interface 328. The controller 316 is configured to provide processing functionality for at least the system 100 and can include the one or more processors 320 (e.g., micro-controllers, circuitry, field programmable gate array (FPGA), central processing units (CPU), application-specific integrated circuit (ASIC), or other processing systems), and resident or external memory 324 for storing data, executable code, and other information. The controller 316 can execute one or more software programs embodied in a non-transitory computer readable medium (e.g., memory 324) that implement techniques described herein. The controller 316 is not limited by the materials from which it is formed or the processing mechanisms employed therein and, as such, can be implemented via semiconductor(s) and/or transistors (e.g., using electronic integrated circuit (IC) components), and so forth.

The memory 324 can be an example of tangible, computer-readable storage medium that provides storage functionality to store various data and/or program code associated with operation of the controller 316, such as software programs and/or code segments, or other data to instruct the controller 316, and possibly other components of the system 100, to perform the functionality described herein. Thus, the memory 324 can store data, such as a program of instructions for operating the system 100, including its components (e.g., controller 316, communication interface 328, etc.), and so forth. The memory 324 may also store data derived from the sensor 312. It should be noted that while a single memory 324 is described, a wide variety of types and combinations of memory 324 (e.g., tangible, non-transitory memory) can be employed. The memory 324 may be integral with the controller 316, may comprise stand-alone memory, or may be a combination of both. Some examples of the memory 324 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the controller 316 may be configured to directly or indirectly adjust the voltage to the electrochromic layer 232. For example, the controller 316 may adjust the voltage to the electrochromic layer 232 based on the first transmission state of the photochromic layer 220 (e.g., as measured by the photochromic sensor), enabling the visor 102 to attain a proper transmittance level. In another example, the controller 316 may adjust the voltage to the electrochromic layer 232 based on a predicted first transmission state of the photochromic layer 220. For instance, the controller 316 may predict the first transmission state of the photochromic layer 220 based on former sensor readings, ambient light measurements, and other parameters, and adjust the voltage to the electrochromic layer 232 based on that prediction.

The communication interface 328 may be operatively configured to communicate with components of the system 100. For example, the communication interface 328 can be configured to retrieve data from the controller 316 or other components, transmit data for storage in the memory 324, retrieve data from storage in the memory 324, and so forth. The communication interface 328 can also be communicatively coupled with the controller 316 to facilitate data transfer between components of the system 100 and the controller 316. It should be noted that while the communication interface 328 is described as a component of the system 100, one or more components of the communication interface 328 can be implemented as external components communicatively coupled to the system 100 via a wired and/or wireless connection. The system 100 can also include and/or connect to one or more input/output (I/O) devices. In embodiments, the communication interface 328 includes or is coupled to a transmitter, receiver, transceiver, physical connection interface, or any combination thereof.

Figure 4:
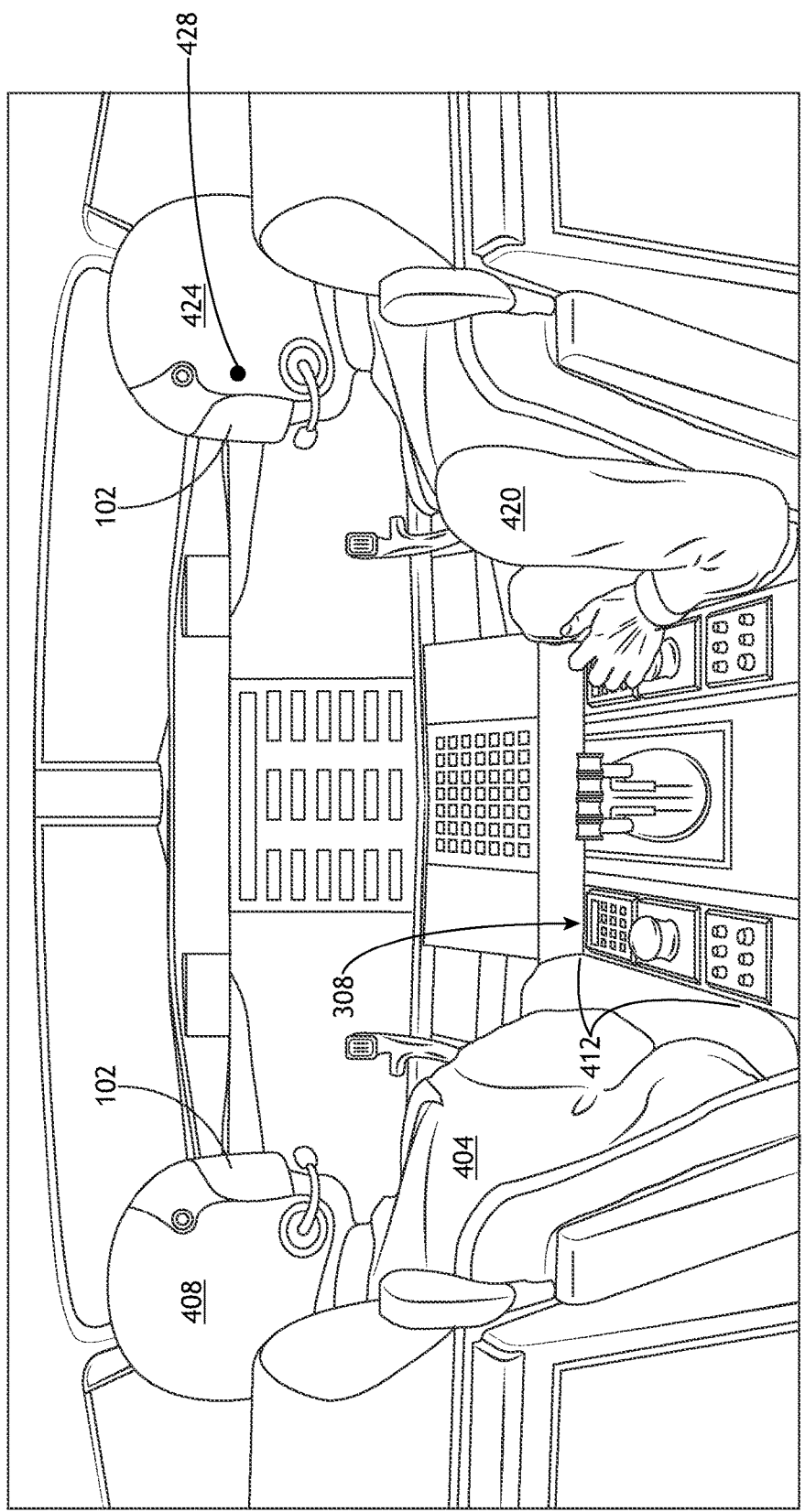
FIG. 4 is a drawing illustrating an example environment 400 of the system 100, in accordance with one or more embodiments of the disclosure.

FIG. 4 is a drawing illustrating an example environment 400 of the system 100, in accordance with one or more embodiments of the disclosure. The example environment 400 includes a first pilot 404 wearing a visor 102 associated with a first pilot helmet 408. The user interface 308 associated with the visor 102 of the first pilot 404 is configured as a button associated with an aircraft instrument panel 412. The example environment 400 further includes a second pilot 420 wearing a visor 102 associated with a second pilot helmet 424. The user interface associate with the visor 102 of the second pilot 420 is configured as a knob 428 located on the second pilot helmet 424.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising:
   a visor, comprising:
      a first lens member comprising:
         a first transparent shield configured with a first viewing area; and
         a photochromic layer coupled to the first transparent shield and configured to adjust a first transmission state of the first viewing area based on the transmission of light through the first viewing area; wherein the first lens member further comprises a curved surface;
      a second lens member comprising:
         a second transparent shield configured with a second viewing area; and
         an electrochromic layer configured to reduce transmission of ambient light through the second viewing area upon an application of a voltage to the electrochromic layer; wherein the second lens member overlaps with the first lens member, wherein the first viewing area and the second viewing area overlap; wherein the second lens member is configured as a flat surface where the first viewing area and the second viewing area overlap;
      a controller configured to adjust a voltage applied to the electrochromic layer, wherein the electrochromic layer is configured to adjust a second transmission state of the electrochromic layer based on the voltage;
      an attachment element coupled to the first lens member and configured to attach to a headgear; and
      a photochromic layer sensor configured to measure light transmittance through the photochromic layer; wherein the controller adjusts the voltage based on the first transmission state.

2. The system of claim 1, wherein the headgear is configured as at least one of a helmet, or head mounted display.

3. The system of claim 1, wherein the second transmission state is further configured to be manually adjustable.

4. The system of claim 1, further comprising an electrochromic layer sensor configured to measure light transmittance through the electrochromic layer.

5. The system of claim 1, further comprising a visor sensor configured to measure light transmittance through the visor.

6. The system of claim 1, further comprising a user interface configured to adjust the voltage applied to the electrochromic layer.

7. The system of claim 6, wherein the user interface is disposed on an instrument panel.

8. The system of claim 6, wherein the user interface is disposed on the headgear.

9. The system of claim 1 further comprising an ambient light sensor communicatively coupled to the electrochromic layer configured to detect ambient light levels in at least one of an area adjacent to the visor or within a cockpit.

10. The system of claim 9, wherein the ambient light sensor is physically coupled to at least one of the visor or the headgear.

* * * * *